(12) United States Patent
Chang et al.

(10) Patent No.: US 7,479,760 B2
(45) Date of Patent: Jan. 20, 2009

(54) MOBILE COMMUNICATION DEVICE WITH DUAL CHARGING PORTS

(75) Inventors: Szu-Tsung Chang, Taipei (TW); Jun Rao, Shanghai (CN); Chiung-Hsien Wu, Taipei (TW)

(73) Assignee: Inventec Appliances Corp., Taipei (TW)

( * ) Notice: Subject to any disclaimer, the term of this patent is extended or adjusted under 35 U.S.C. 154(b) by 117 days.

(21) Appl. No.: 11/584,596

(22) Filed: Oct. 23, 2006

(65) Prior Publication Data

US 2007/0090789 A1 Apr. 26, 2007

(30) Foreign Application Priority Data

Oct. 24, 2005 (CN) .......................... 94 2 18364 U

(51) Int. Cl.
*H01M 10/46* (2006.01)
(52) U.S. Cl. ..................................... 320/115
(58) Field of Classification Search ................. 320/107, 320/112, 114, 115
See application file for complete search history.

(56) References Cited

U.S. PATENT DOCUMENTS

| 6,701,394 | B2* | 3/2004 | Wang | 710/62 |
| 6,891,351 | B2* | 5/2005 | Chen | 320/115 |
| 2001/0006336 | A1* | 7/2001 | Yi et al. | 320/115 |

* cited by examiner

*Primary Examiner*—Edward Tso
(74) *Attorney, Agent, or Firm*—Birch, Stewart, Kolasch & Birch, LLP

(57) ABSTRACT

A mobile communication device is provided for inserting into a charging seat. The charging seat has a reception chamber and a charging circuit with a first coupling section. The mobile communication device includes: an outer casing for inserting into the reception chamber along a predetermined direction, and a first charging port formed at a lateral side surface of the outer casing. When the outer casing is inserted into the reception chamber, the first coupling section of the charging circuit extends into the first charging port in the outer casing to permit the charging circuit to conduct a charging operation.

15 Claims, 4 Drawing Sheets

MOBILE COMMUNICATION DEVICE WITH DUAL CHARGING PORTS

FIELD OF THE INVENTION

The invention relates to a mobile communication device, and more particularly to a mobile communication device having dual charging ports and a charging seat. The charging seat has a reception chamber formed with a charging circuit for charging a charging port formed at a lateral side surface of the mobile communication device.

BACKGROUND OF THE INVENTION

The advanced mobile phone technology has entered into the third generation from the second generation. In the second generation, only audio was transmitted via the mobile phone. Several functions have been added into the third generation mobile phone such that the latter possesses audio and video functions, such as taking pictures, listening to music or watching television online. With the increase in functions, the mobile phones of the third generation consume more power when compared to the second generation ones.

On the other hand, manufacturers tend to produce the mobile phone to have dual network systems, i.e. a combination of the mobile network (like GSM/GPRS [Global System for Mobile/General Pocket Radio Service], GSM/W-CDMA [wide-band Code-Division Multiple Access] technology) and WLAN (like Wi-Fi technology) permits the user of the mobile phone to download an audio-and-video file or receive and transmit e-mails over the Internet. Several radiating circuits or signal processing circuits must be set within the mobile phone and a large amount of power is consumed in order to perform the aforementioned operations. A rechargeable battery usually supplies the electrical power required for the mobile phone. The battery must be constantly and fully charged in order to enable the mobile phone to perform one of the several functions.

FIG. 1 illustrates a prior art mobile phone 10 together with a charging device 11. The prior art mobile phone 10 has a bottom surface 101 formed with a charging port 100. The charging device 11 has a standard charging end 110 for extension into the charging port 100 in the mobile phone for conducting a charging operation once the charging device 11 is coupled to an external power source, such as an electrical outlet on a house wall.

Note that the mobile phone 10 usually is formed with only one charging port 100. That is, the only charging port 100 can be used whether the charging device 11 is a travel charger or a seat charger. As a result, pulling/plugging the standard charging end 110 out/into the only charging port 100 repeatedly for the frequent charging operation may cause the charging port to be damaged easily. To solve the problem and to be more convenient to users, a mobile communication device including a handset formed with dual charging ports and a charging device are provided.

SUMMARY OF THE INVENTION

It is the object of the present invention to provide a mobile communication device including a handset formed with dual charging ports and a charging device that is adapted to charge the handset optionally depending on its location or habits of the user.

In one aspect of the present invention, a mobile communication device is provided for inserting into a charging seat. The charging seat has a reception chamber and a charging circuit with a first coupling section. The mobile communication device includes: an outer casing for inserting into the reception chamber in the charging seat along a predetermined direction; and a first charging port formed at a lateral side surface of the outer casing. When the outer casing is inserted into the reception chamber in the charging seat, the first coupling section of the charging circuit extends into the first charging port in the outer casing to permit the charging circuit to conduct a charging operation.

In a second aspect of the present invention, a charging device is provided for a mobile communication device, the mobile communication device including an outer casing formed with a first charging port. The charging device includes: an insulated body having an inner peripheral wall defining a reception chamber for receiving the outer casing; and a charging circuit fabricated within the insulated body, and having a first coupling section exposed from the inner peripheral wall of the reception chamber and a second coupling section for coupling to an external power source. When the outer casing is inserted into the reception chamber in the insulated body, the first coupling section of the charging circuit extends into the first charging port in the outer casing to permit the charging circuit to conduct a charging operation.

BRIEF DESCRIPTION OF THE DRAWINGS

Other features and advantages of this invention will become more apparent in the following detailed description of the preferred embodiment of this invention, with reference to the accompanying drawings, in which.

DETAILED DESCRIPTIONS OF THE PREFERRED EMBODIMENTS

Figure 1:
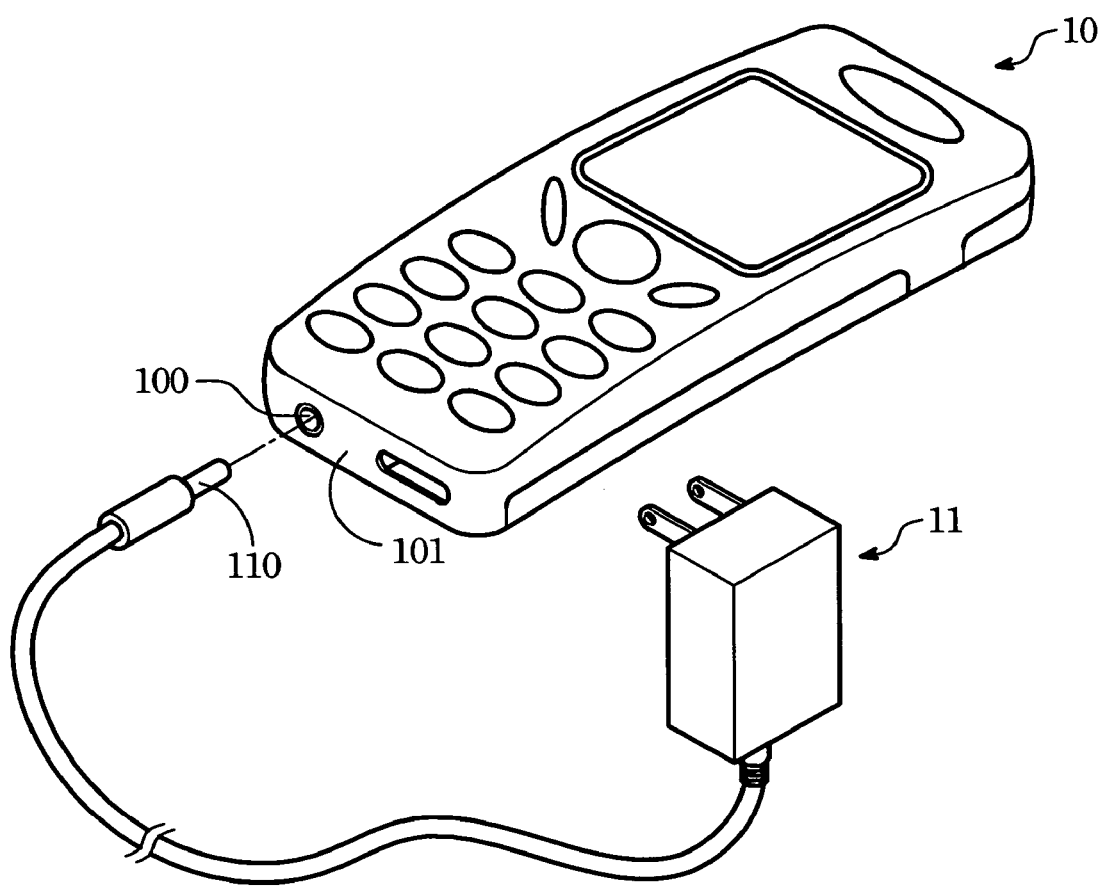
FIG. 1 is a perspective view of a prior art mobile phone shown together with a charging device.
Figure 2A:
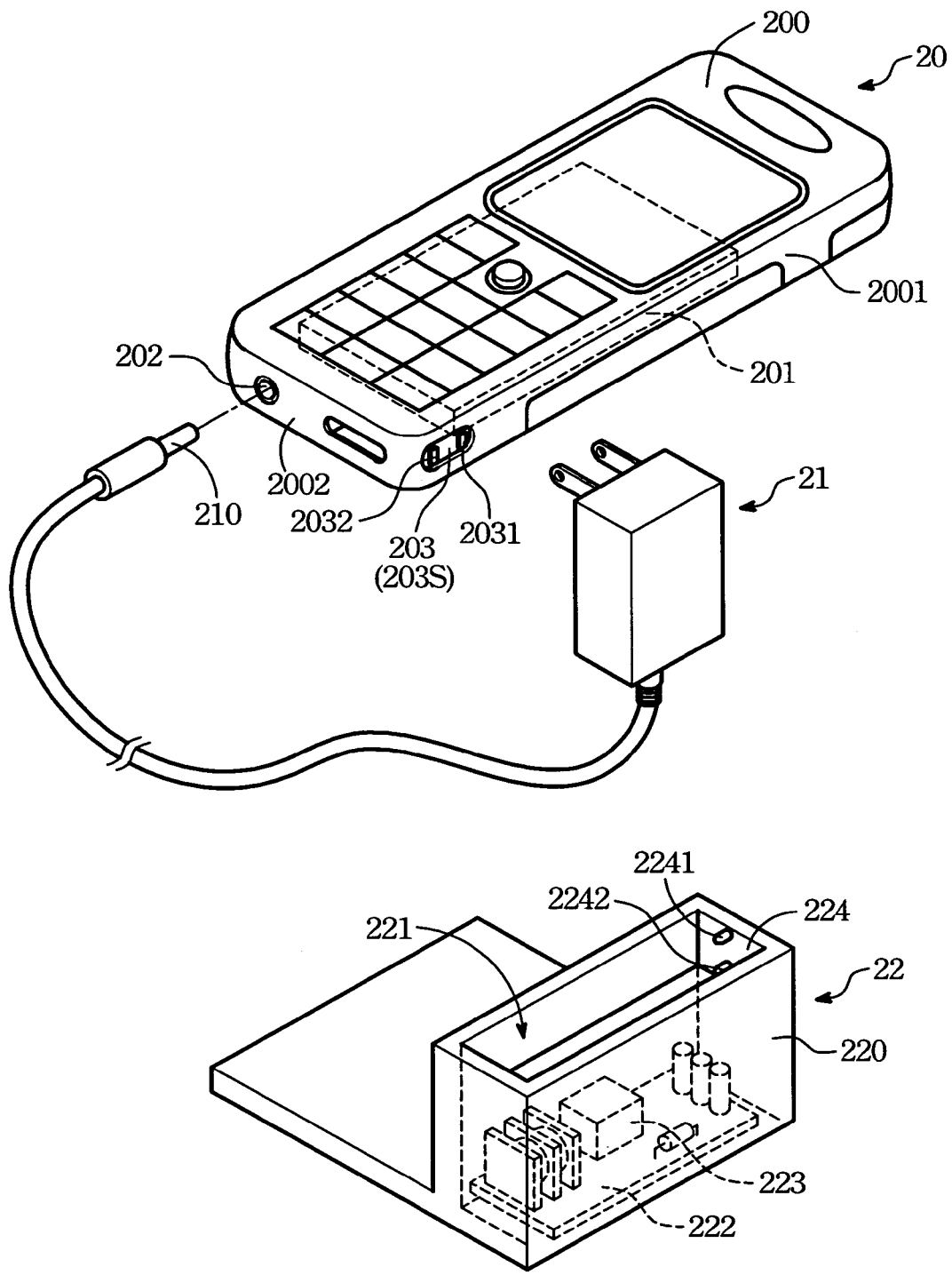
FIG. 2A is a perspective view of a mobile communication device of the present invention.
Figure 2:
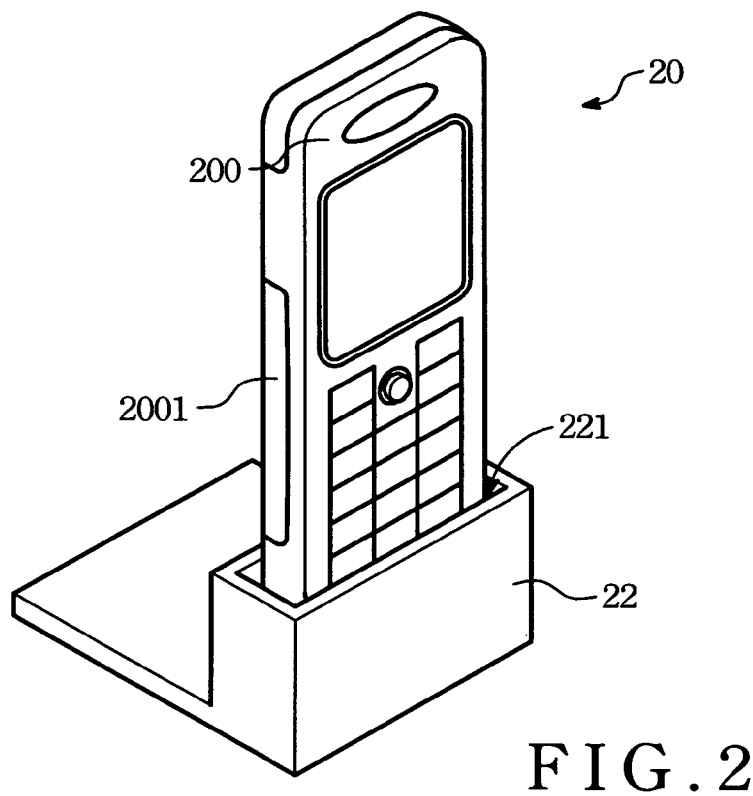
FIG. 2B illustrates how a handset is inserted into a charging device for charging the same according to the present invention.

Referring to FIGS. 2A and 2B, a mobile communication device 20 of the present invention is shown, and includes a handset 200 (herein called an outer casing), a rechargeable battery mounted on the outer casing 200, and a charging system. The outer casing 200 has a lateral side surface 2001 formed with a first charging port 203. The outer casing 200 further has a bottom side 2002 formed with a second charging port 202. The lateral side surface 2001 is perpendicular to the bottom side 2002.

The charging system according to the present invention includes a standard charging seat 21 (such as a travel charger) having a standard coupling end 210 for coupling to the second charging port 202 in order to conduct a charging operation once the charging seat 21 is inserted into an external power source (such as an electrical outlet on a wall). The standard coupling end 210 can be a USB (universal serial bus) terminal or a DC (Direct Current) coaxial cable terminal depending on the structure of the charging port 202.

The charging system further includes a charging seat 22 and a charging circuit 222. The charging seat 22 includes an insulated body 220 formed with an inner peripheral wall defining a reception chamber 221.

The charging circuit 222 is fabricated within the insulated body 220, and has a first coupling section 224 exposed to the reception chamber 221 and a second coupling section 223 for connection with an external power source (not shown). In this embodiment, the first charging port 203 is formed with an innermost wall 203S that confines a bottom side of the first charging port 203 and that is formed with a pair of spaced apart recesses. Two electrodes 2031, 2032 are disposed respectively in the recesses within the first charging port 203 and are connected electrically to the charging circuit 222. The first coupling section 224 of the charging circuit 222 has two conductive terminals 2241,2242 projecting resiliently into the reception chamber 221 of the insulated body 220 such that once the outer casing 200 is inserted into the reception chamber 221 along a predetermined direction, the conductive terminals 2241, 2242 respectively contact the electrodes 2031, 2032 within the first charging port 203 so as to form an electrical communication there among (i.e. the charging circuit 222 conducts the charging operation).

Figure 3:
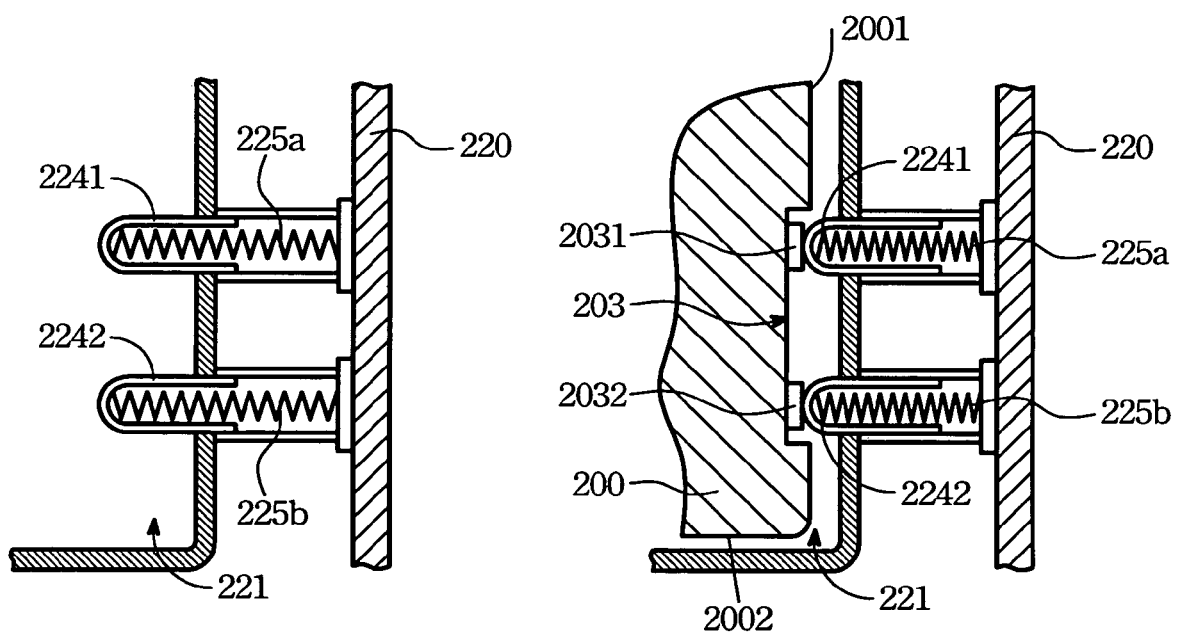
FIG. 3A is a fragmentary cross sectional view of the charging device prior to insertion of the handset shown in FIG. 2A.
FIG. 3B is a fragmentary cross sectional view of the charging device after insertion of the handset shown in FIG. 2A.

Referring to FIGS. 3A and 3B, the charging device further includes two urging members 225a,225b (compression springs) disposed in the insulated body 220 for resiliently urging the conductive terminals 2241, 2242 to project into the reception chamber 221 via the inner peripheral wall such that once the outer casing 200 is inserted into the reception chamber 221, the conductive terminals 2241,2242 respectively and resiliently contact the electrodes 2031, 2032 within the first charging port 203 by virtue of the restoration force of the urging members 225a, 225b (see FIG. 3B).

Figure 4:
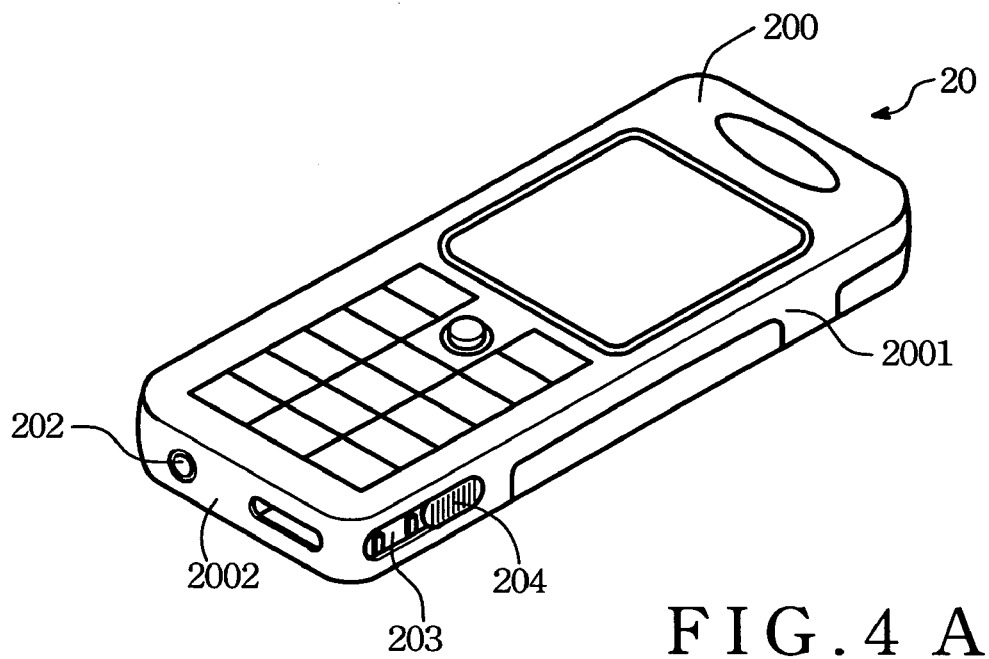
FIG. 4A is a perspective view exposing a charging port in another mobile communication device of the present invention.
FIG. 4B is a perspective view illustrating how the charging port in another mobile communication device of the present invention is covered by a protection shield.
Figure 4:
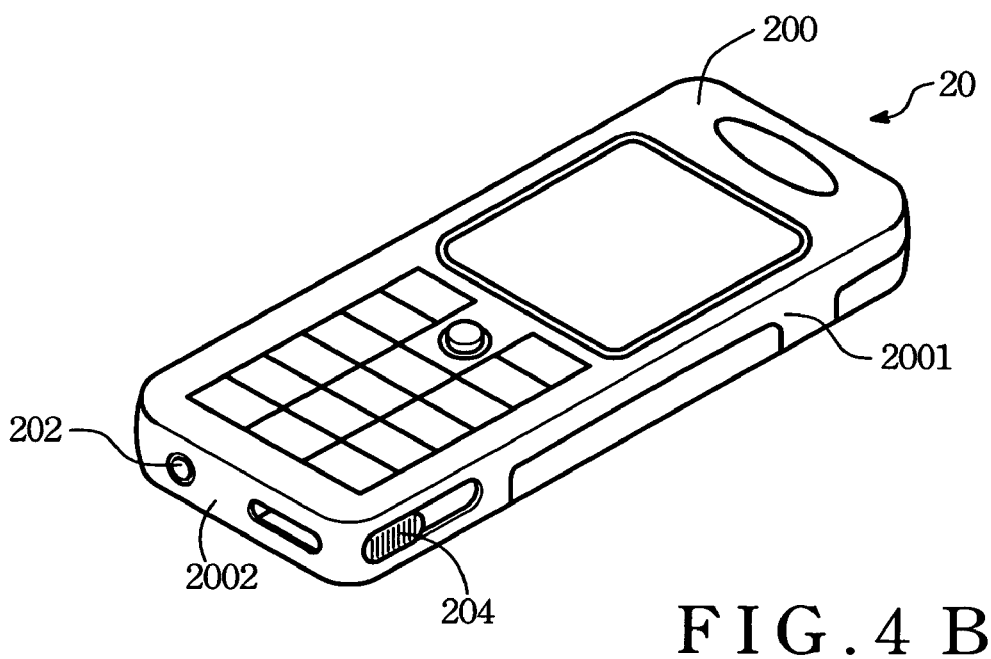

Referring FIGS. 4A and 4B, a second embodiment of the mobile communication device 20 of the present invention is shown to have a structure similar to the previous embodiment. The only difference resides in that the second embodiment includes a protection shield 204 movably within the first charging port 203 for optionally covering the first charging port 203 in the outer casing 200. The protection shield 204 is made from a dielectric material, and is moved to the right side of the first charging port 203 in order to expose the electrodes for charging thereat and the left side of the first charging port for concealing the electrodes in the normal condition (i.e. when the charging operation is not conducted).

The mobile communication device of the present invention can be a mobile phone, a PDA (Personal Digital Assistant), a smart phone or a Pocket PC (personal computer).

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A mobile communication device for inserting into a charging seat, the charging seat having a reception chamber and a charging circuit with a first coupling section, the mobile communication device comprising:

an outer casing for inserting into the reception chamber in the charging seat along a predetermined direction;

a first charging port formed at a lateral side surface of said outer casing;

a second charging port formed at a bottom side of said outer casing; and a standard charging seat having a standard coupling end for coupling to said second charging port in order to conduct a charging operation, wherein, when said outer casing is inserted into the reception chamber in the charging seat, the first coupling section of the charging circuit extends into said first charging port in said outer casing to permit the charging circuit to conduct a charging operation.

2. The mobile communication device according to claim 1, wherein the charging circuit further has a second coupling section for connection with an external power source.

3. The mobile communication device according to claim 1, wherein said first charging port is formed with an innermost wall that confines a bottom side of said first charging port and that is formed with a pair of spaced apart recesses, the mobile communication device further comprising a pair of electrodes disposed respectively in said recesses within said first charging port and connected electrically to the charging circuit.

4. The mobile communication device according to claim 3, wherein the first coupling section of the charging circuit has two conductive terminals projecting into the reception chamber in the charging seat such that once said outer casing is inserted into the reception chamber, the conductive terminals respectively contact said electrodes within said first charging port so as to form an electrical communication thereamong.

5. The mobile communication device according to claim 4, wherein the charging seat includes an insulated body formed with an inner peripheral wall defining the reception chamber and two urging members disposed in said insulated body for resiliently urging the conductive terminals to project into the reception chamber via the inner peripheral wall such that once said outer casing is inserted into the reception chamber, the conductive terminals respectively and resiliently contact said electrodes within said first charging port.

6. The mobile communication device according to claim 1, wherein said standard coupling end is a USB (universal serial bus) terminal or a DC (Direct Current) coaxial cable terminal.

7. The mobile communication device according to claim 1, further comprising a protection shield for covering said first charging port in said outer casing, said protection shield being made from a dielectric material.

8. The mobile communication device according to claim 1, wherein the mobile communication device is a mobile phone, a PDA (personal digital assistant), a smart phone or a pocket personal computer.

9. A charging device for a mobile communication device, the mobile communication device including an outer casing formed with a first charging port and a second charging port, the charging device comprising:

an insulated body having an inner peripheral wall defining a reception chamber for receiving the outer casing;

a charging circuit fabricated within said insulated body, and having a first coupling section exposed from said inner peripheral wall of said reception chamber and a second coupling section for coupling to an external power source; and a standard charging seat having a standard coupling end, wherein, when the outer casing is inserted into said reception chamber in said insulated body, said first coupling section of said charging circuit extends into the first charging port in said outer casing to permit said charging circuit to conduct a charging operation, when the second charging port is coupled to the standard coupling end of the standard charging seat, the standard charging seat and the mobile communication are conducted in a charging operation.

10. The charging device according to claim 9, wherein the outer casing has a lateral side surface formed with the first charging port.

11. The charging device according to claim 9, wherein the first charging port is formed with an innermost wall that confines a bottom side of the first charging port and that is formed with a pair of spaced apart recesses, the mobile communication device further including a pair of electrodes disposed respectively in the recesses within the first charging port and connected electrically to said charging circuit.

12. The charging device according to claim 11, wherein said first coupling section of said charging circuit has two conductive terminals projecting into said reception chamber in said insulated body via said inner peripheral wall such that once the outer casing is inserted into said reception chamber, said conductive terminals respectively contact the electrodes within the first charging port so as to form an electrical communication thereamong.

13. The charging device according to claim 12, further comprising two urging members disposed in said insulated body for resiliently urging said conductive terminals to project into said reception chamber via said inner peripheral wall such that once the outer casing is inserted into said reception chamber, said conductive terminals respectively and resiliently contact the electrodes within the first charging port.

14. The charging device according to claim 9, wherein said standard coupling end is a USB (universal serial bus) terminal or a DC coaxial cable terminal.

15. The charging device according to claim 9, wherein the mobile communication device is a mobile phone, a PDA (personal digital assistant), a smart phone or a pocket personal computer.

\* \* \* \* \*